`US012465865B2`

(12) United States Patent
Smith (10) Patent No.: US 12,465,865 B2
(45) Date of Patent: Nov. 11, 2025

(54) SYSTEMS AND METHODS FOR PROVIDING AN IMAGE FOR AN ATTRACTION SYSTEM

(71) Applicant: Universal City Studios LLC, Universal City, CA (US)

(72) Inventor: Kevin Smith, Apopka, FL (US)

(73) Assignee: Universal City Studios LLC, Universal City, CA (US)

(*) Notice: Subject to any disclaimer, the term of this patent is extended or adjusted under 35 U.S.C. 154(b) by 536 days.

(21) Appl. No.: 18/060,854

(22) Filed: Dec. 1, 2022

(65) Prior Publication Data

US 2023/0226459 A1 Jul. 20, 2023

Related U.S. Application Data

(60) Provisional application No. 63/299,686, filed on Jan. 14, 2022.

(51) Int. Cl.
*A63G 31/02* (2006.01)
*G03B 29/00* (2021.01)

(52) U.S. Cl.
CPC ............ *A63G 31/02* (2013.01); *G03B 29/00* (2013.01)

(58) Field of Classification Search
CPC ................................ A63G 31/02; G03B 29/00
USPC ............................................................. 472/61
See application file for complete search history.

(56) References Cited

U.S. PATENT DOCUMENTS

| | | | |
|---|---|---|---|
| 9,958,767 B1 | 5/2018 | Reichow et al. | |
| 10,099,149 B2 | 10/2018 | Boyle | |
| 10,235,787 B2 | 3/2019 | Lynch | |
| 10,525,364 B2 | 1/2020 | Bluhm | |
| 10,794,719 B2 | 10/2020 | Kunii et al. | |
| 11,210,843 B1 | 12/2021 | Coffey et al. | |
| 11,559,750 B2 * | 1/2023 | Melo | A63J 1/02 |
| 11,584,406 B2 * | 2/2023 | Alarcon | B61B 13/00 |
| 2010/0078291 A1 * | 4/2010 | Fritsche | B66B 21/10 |
| | | | 198/324 |
| 2012/0149479 A1 | 6/2012 | Nemeth et al. | |
| 2020/0307651 A1 | 10/2020 | Bertoncello et al. | |
| 2020/0307658 A1 | 10/2020 | Towns, Jr. | |

FOREIGN PATENT DOCUMENTS

GB 466855 A 6/1937

OTHER PUBLICATIONS

Geerse, Daphne J., et al., Assessing Walking Adaptability in Parkinson's Disease: "The Interactive Walkway," Frontiers in Neurology, Dec. 12, 2018, pp. 1-11, https://www.frontiersin.org/articles/10.3389/fneur.2018.01096/full.
WorldStage Lab, "Projection on Moving Targets," Dec. 3, 2015, pp. 1-2, Vimeo, https://vimeo.com/147770711?embedded=true&source=vimeo_logo&owner=46459608.
Franco, Rodrigo, "Live Projection Mapping + Kinect," Jun. 19, 2013, p. 1-5, Behance, https://www.behance.net/gallery/9353869/Live-Projection-Mapping-Kinect.
PCT/US2023/010595 International Search Report and Written Opinion mailed May 10, 2023.

* cited by examiner

*Primary Examiner* — Laura K Tso
(74) *Attorney, Agent, or Firm* — Fletcher Yoder, P.C.

(57) ABSTRACT

An attraction system of an amusement park includes a ride vehicle that moves along a path of the attraction system. A pathway moves alongside the ride vehicle, and a projector projects an image that follows movement of the ride vehicle along the path and movement of the pathway alongside the ride vehicle.

20 Claims, 4 Drawing Sheets

SYSTEMS AND METHODS FOR PROVIDING AN IMAGE FOR AN ATTRACTION SYSTEM

CROSS-REFERENCE TO RELATED APPLICATION

This application claims priority to and the benefit of U.S. Provisional Application No. 63/299,686, entitled "SHOW EFFECT SYSTEM FOR ATTRACTION SYSTEM," filed Jan. 14, 2022, which is hereby incorporated by reference in its entirety for all purposes.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Amusement parks and other entertainment venues may include various features to entertain guests. For example, an amusement park may include a ride, such as a roller coaster, a water ride, a dark ride, and so forth. In some embodiments, a ride may include a ride vehicle in which a guest may be positioned during operation of the ride. For instance, the guest may enter the ride vehicle to begin a ride cycle, the ride vehicle may carry the guest along a path during the ride cycle, and the guest may exit the ride vehicle after the ride cycle has been completed. It is presently recognized that it may be desirable to provide unique and effective techniques for instructing or guiding the guest to transition into and/or out of the ride vehicle to facilitate operation of the ride.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, an attraction system of an amusement park includes a ride vehicle that moves along a path of the attraction system. A pathway moves alongside the ride vehicle, and a projector projects an image that follows movement of the ride vehicle along the path and movement of the pathway alongside the ride vehicle.

In one embodiment, an attraction system of an amusement park includes a path system with a first path section and a second path section configured to move alongside one another, a ride vehicle coupled to the first path section such that movement of the first path section drives movement of the ride vehicle, and a projector configured to project an image that follows the movement of ride vehicle and movement of the second path section.

In one embodiment, an attraction system of an amusement park includes a ride vehicle configured to move along a path of the attraction system, a projector configured to project an image, and a controller communicatively coupled to the projector. The controller is configured to determine a position of the ride vehicle, determine a target location based on the position of the ride vehicle, and instruct the projector to project the image at the target location to maintain a location of the image relative to the ride vehicle during movement of the ride vehicle along the path.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present disclosure is directed to a system or feature of an amusement park. The amusement park may include various attraction systems, such as rides and theatrical systems, to entertain guests. For example, an attraction system may include a ride vehicle. A guest may enter the ride vehicle, and the ride vehicle may carry the guest along a path after the guest has entered the ride vehicle. The guest may then exit the ride vehicle after the ride vehicle has traversed the path.

In some circumstances, it may be difficult for a guest to enter the ride vehicle and/or exit the ride vehicle. This may be relevant for any ride vehicle but may be a special issue for certain ride configurations, certain ride vehicle configurations, or certain guests. For example, the ride vehicle may have an irregular geometry and/or another object of the attraction system may impede or obstruct guest movement into and/or out of the ride vehicle. In such circumstances, it may be difficult to operate the attraction system efficiently. As an example, operation of the attraction system may be briefly suspended to help a guest enter the ride vehicle and/or exit the ride vehicle. As another example, an operator may provide instructions to guide guests to enter the ride vehicle and/or exit the ride vehicle. However, the operator may not be able to perform other actions or services to help with operation of the attraction system while providing the instructions. Additionally or alternatively, an experience of the guest may be impacted by the difficulty associated with entering and/or exiting from the ride vehicle. For instance, a guest may not be comfortably positioned within the ride vehicle because of the difficulty associated with entering the ride vehicle, and an overall experience provided by the attraction system may be diminished or impaired as a result.

Thus, it is presently recognized that providing instructions or guidance in an efficient manner to enter and/or exit a ride vehicle may improve operation of an attraction system, such as by improving efficient operation of a ride vehicle and/or improving the experience provided by the attraction system to a guest. Thus, embodiments of the present disclosure are directed to projecting an image that moves along with or follows a ride vehicle to help a guest enter and/or exit the ride vehicle. Indeed, the image may be projected in a manner that restricts relative movement between the image and the ride vehicle to help the guest view the image. For instance, the guest may enter and/or exit the ride vehicle while the ride vehicle is in motion. In such an embodiment, a path (e.g., a conveyor belt, a moving belt, a rotating platform, a moving pathway) adjacent to the ride vehicle may move along with the ride vehicle to help the guest enter and/or exit the ride vehicle from the path. Restricting movement between the projected image and the ride vehicle may present the image in a more accessible manner to the guest while the guest is in motion with the ride vehicle and/or with the path adjacent or proximate to the ride vehicle. In an embodiment, the image may be projected onto the path and adjacent to the ride vehicle to enable the guest navigating the path to view the image more readily and in context with the ride vehicle (e.g., the projection may include imagery that points to or otherwise indicates aspects of the ride vehicle). Additionally, or alternatively, the image may be projected fully or partially onto the ride vehicle. For example, the image may refer directly to certain parts of the ride vehicle, and the image may be projected onto such parts to provide a more meaningful visualization.

The attraction system may include a projector configured to present the image. In one embodiment, the projector may be coupled to the ride vehicle. Thus, movement of the projector and the image provided by the projector may naturally be in synchronization with movement of the ride vehicle. In an additional or alternative embodiment, the projector may be coupled to a different support of the attraction system, and the ride vehicle may move relative to the support. In such an embodiment, the projector may adjust the image being provided to follow or track movement of the ride vehicle. To this end, a control system may be communicatively coupled to the projector and may instruct the projector to adjust a location where the image is being projected to correspond to a ride vehicle location. For example, the control system may determine a position of the ride vehicle, determine a target location of the image based on the position of the ride vehicle, and instruct the projector to output the image at the target location. Thus, as the ride vehicle moves, an updated position of the ride vehicle may be determined (e.g., based on image tracking, a global positioning system, positions sensors), an updated target location of the image may be determined based on the updated position of the ride vehicle, and the projector may be instructed to output an image at the updated target location to maintain a relative position of the image with respect to the ride vehicle. Although embodiments of the present disclosure are particularly directed to projecting an image to provide instructions or guidance to enter and/or exit a ride vehicle, the image being projected may include any additional or any suitable image. For example, the image may include other instructions and/or a visualization that is unrelated to instructions, such as decorative lighting and/or a graphic effect.

Figure 1:
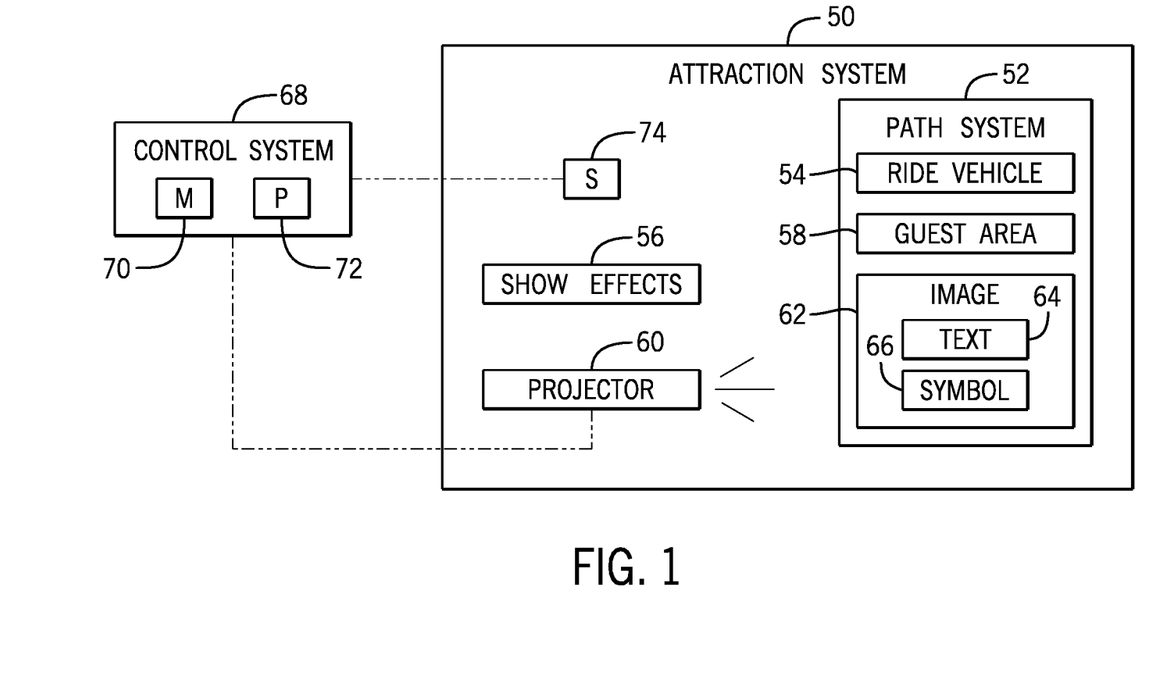
FIG. 1 is a schematic diagram of an embodiment of an attraction system, in accordance with an aspect of the present disclosure.

With the preceding in mind, FIG. 1 is a schematic diagram of an embodiment of an attraction system 50. The attraction system 50 may include a path system 52. The path system 52 may have a path along which a ride vehicle 54 of the attraction system 50 may travel. In one embodiment, the path system 52 may include a track to which the ride vehicle 54 may be coupled, and the ride vehicle 54 may move via the track during operation of the attraction system 50. In an additional or alternative embodiment, the path system 52 may include an open path (e.g., a trail or open space) along which the ride vehicle 54 may travel. Movement of the ride vehicle 54 through the attraction system 50 via the path system 52 may entertain a guest that is positioned within the ride vehicle 54. For example, movement of the ride vehicle 54 may impart movement sensations (e.g., gravitational forces) onto the guest. Additionally or alternatively, the ride vehicle 54 may travel through the attraction system 50 to transport the guest to a part of the attraction system 50 where show effects 56, such as a visual effect (e.g., lighting), an audio effect (e.g., a sound effect, music), and/or other features (e.g., a robot figure, a smoke effect) may be provided to entertain the guest.

The path system 52 may also include a guest area 58 where the guest of the attraction system 50 may navigate. By way of example, the guest area 58 may include a walkway, a queue, a line, and the like, along which the guest may walk to travel through the attraction system 50. In an embodiment, the guest may enter the ride vehicle 54 and/or exit the ride vehicle 54 via the guest area 58. For instance, at a part of the attraction system 50, such as at a loading/unloading station within the attraction system 50, the ride vehicle 54 and the guest area 58 may be positioned adjacent to one another. Thus, the guest may approach the ride vehicle 54 from the guest area 58 to enter the ride vehicle 54, and/or the guest may depart from the ride vehicle 54 onto the guest area 58 (e.g., to navigate toward an exit to leave the attraction system 50). At a remainder of the attraction system 50, the ride vehicle 54 and the guest area 58 may not be positioned adjacent to one another. For example, the ride vehicle 54 may travel away from the guest area 58 via the path system 52 (e.g., after the guest should have entered the ride vehicle 54).

In the illustrated embodiment, the attraction system 50 includes a projector 60 configured to project an image 62 within or onto the path system 52. In an embodiment, the projector 60 may be part of or integrated with the ride vehicle 54. The image 62 being projected may help the guest enter and/or exit the ride vehicle 54. By way of example, the image 62 may provide instructions, directions, or other guidance that may help the guest efficiently transition between the ride vehicle 54 and the guest area 58. In an embodiment, the image 62 may include text 64, such as textual instructions that may provide directions for the guest to enter and/or exit the ride vehicle 54. In an additional or alternative embodiment, the image 62 may include a symbol 66, such as an arrow, a footprint, and the like, that may portray instructions to the guest. Indeed, the symbol may include specific targets for guest positioning (e.g., foot and hand placements as part of a process of loading/unloading). In a further embodiment, the image 62 may be constantly modified or updated, such as to provide an animation (e.g., a video that includes multiple images 62 that are sequentially cycled through). The image 62 may provide a clearer indication regarding how to enter and/or exit the ride vehicle 54, thereby reducing a difficulty for the guest to transition between the ride vehicle 54 and the guest area 58. Thus, the image 62 may improve an experience provided by the attraction system 50 to the guest and increase throughput efficiency.

In an example, the ride vehicle 54 may be in motion (e.g., within the loading/unloading station) while the guest is entering and/or exiting the ride vehicle 54. A portion of the guest area 58 (e.g., a conveyor belt, a moving belt, a rotating platform, a moving pathway), such as a portion that is positioned adjacent or proximate to the ride vehicle 54, may also be in motion alongside the ride vehicle 54 to facilitate entering and/or exiting the ride vehicle 54 via the guest area 58. However, the guest may not easily determine an efficient way to transition between the ride vehicle 54 and the guest area 58. For instance, the guest may lack balance, the ride vehicle 54 may be irregularly shaped, and/or an object may block or impede entrance and/or exit of the ride vehicle 54. Thus, the image 62 may guide the guest to transition between the ride vehicle 54 and the guest area 58 in a more efficient manner to enable continued operation of the attraction system 50 by providing instructions or guidance (e.g., detailed and timed instructions for bodily positioning).

In one embodiment, the projector 60 may output the image 62 onto the guest area 58, such as at a location adjacent or proximate to the ride vehicle 54. Thus, while the guest is transitioning either direction between the ride vehicle 54 and the guest area 58, the image 62 may be more readily and easily viewed by the guest. The projector 60 may additionally or alternatively output the image 62 onto the ride vehicle 54 to provide clearer instructions (e.g., where to position a foot within the ride vehicle 54 when in the process of transitioning into or out of the ride vehicle 54) with respect to features of the ride vehicle 54. For either case, in an embodiment in which the ride vehicle 54 and/or the guest area 58 are in movement alongside one another while the guest transitions between the ride vehicle 54 and the guest area 58, the image 62 presented by the projector 60 may follow movement of the ride vehicle 54 and/or of the guest area 58. Indeed, a location of the image 62 relative to the ride vehicle 54 and/or a location of the image 62 relative to the guest area 58 may be maintained to enable the guest to view the image 62 while in motion via the ride vehicle 54 and/or the guest area 58. To this end, the projector 60 may be coupled or secured to a part of the ride vehicle 54. Thus, movement of the ride vehicle 54 may drive corresponding movement of the projector 60 and cause the image 62 presented by the projector 60 to move with the projector 60. Additionally, or alternatively, a positioning and/or orientation of the projector 60 may be adjusted to change a location where the image 62 is presented. For example, the projector 60 may be coupled to or secured to a support of the attraction system 50 (e.g., a wall, a ceiling), and the ride vehicle 54 and/or the guest area 58 may move relative to the support and therefore the projector 60. Thus, the projector 60 may present the image 62 that may follow or track movement of the ride vehicle 54 and/or of the guest area 58, thereby reducing relative movement between the projector 60 and/or the ride vehicle 54 and/or between the projector 60 and/or the guest area 58, to enable the guest to view the image 62 more easily.

In an embodiment in which multiple guests may be transitioning between the guest area 58 and respective ride vehicles 54, a separate image 62 may be projected for each of the ride vehicles 54. For example, each image 62 may be projected adjacent to an associated ride vehicle 54 to enable the guests to transition between a particular associated ride vehicle 54 and the guest area 58. Thus, different guests may observe a respective image 62 being projected to help transition between a different associated ride vehicle 54 and the guest area 58. In an additional or alternative embodiment, a single image 62 (e.g., a continuous image) may be projected to facilitate guests transitioning between the guest area 58 and respective ride vehicles 54, and the image 62 may include different elements (separate component images) that are positioned adjacent to the respective ride vehicles 54. As such, different guests may observe different elements of the image 62 to help the guests transition between different associated ride vehicles 54 and the guest area 58.

The projector 60 may be communicatively coupled to a control system 68 (e.g., an automation controller, a programmable controller, an electronic controller, control circuitry, a cloud computing system). The control system 68 may include a memory 70 and processing circuitry 72. The memory 70 may include volatile memory, such as random access memory (RAM), and/or non-volatile memory, such as read-only memory (ROM), optical drives, hard disc drives, solid-state drives, or any other non-transitory computer-readable medium that includes instructions. The processing circuitry 72 may be configured to execute such instructions. For example, the processing circuitry 72 may include one or more application specific integrated circuits (ASICs), one or more field programmable gate arrays (FPGAs), one or more general purpose processors, or any combination thereof. The control system 68 may instruct the projector 60 to provide the image 62. For instance, the control system 68 may transmit image data to the projector 60, and the projector 60 may provide the image 62 based on the image data received from the control system 68. As previously noted, the image 62 may be a single projection or multiple smaller images that are each associated with a different ride vehicle 54. However, as also noted above, in some embodiments, individual projectors 60 may be associated with (e.g., coupled to, positioned adjacent to) respective ride vehicles 54 to provide images 62 that are respectively associated with individual ride vehicles 54.

The control system 68 may cause the projector 60 to enable or suspend presentation of the image 62. As an example, the control system 68 may determine a position of the ride vehicle 54 within the attraction system 50 (e.g., with respect to the projector 60 or loading/unloading area) and control projection based on the position. In response to a determination that the position of the ride vehicle 54 indicates the image 62 is to be projected, such as when the ride vehicle 54 is adjacent or proximate to the guest area 58 (e.g., the ride vehicle 54 is within the loading/unloading station), the control system 68 may instruct the projector 60 to present the image 62. However, in response to a determination that the position of the ride vehicle 54 indicates the image 62 is not to be projected, such as when the ride vehicle 54 is not adjacent or proximate to the guest area 58 (e.g., the ride vehicle 54 is external to the loading/unloading station), the control system 68 may cause the projector 60 to suspend presentation of the image 62. In this manner, the control system 68 may limit presentation of the image 62 to a period of time when a guest may utilize the image 62 to transition between the ride vehicle 54 and the guest area 58, thereby reducing energy consumption associated with projecting the image 62.

The control system 68 may additionally or alternatively cause the projector 60 to adjust projection of the image 62. For instance, the control system 68 may cause the projector 60 to present the image 62 at a particular location corresponding to the position of the ride vehicle 54 in the attraction system 50. As an example, the control system 68 may determine a target location of the image 62 based on the position of the ride vehicle 54. The target location may include a location on the guest area 58 adjacent or proximate to the position of the ride vehicle 54 and/or a position of a part or component of the ride vehicle 54. The control system 68 may instruct the projector 60 to present the image 62 at the target location. As the ride vehicle 54 moves within the attraction system 50, the target location may be updated, and the control system 68 may instruct the projector 60 to present the image 62 at the updated target location. By way of example, the control system 68 may instruct the projector 60 to move the location of the image 62 to follow movement of the ride vehicle 54 within the attraction system 50 (e.g., to accommodate relative movement of the ride vehicle 54 with respect to the projector 60). In an embodiment where the projector 60 is resident on the ride vehicle 54, relative movement between the ride vehicle 54 and the projector 60 may be negligible and factored out so that the projector 60 can provide the image 62 on, within, or outside of (e.g., on a surface of the guest area 58) the ride vehicle 54 without any adjustment for relative movement between the projector 60 and the ride vehicle 54.

As a further embodiment, the control system 68 may instruct the projector 60 to adjust the image 62 being provided based on the position of the ride vehicle 54. That is, depending on sensed locations of the ride vehicle 54, the projector 60 may provide differing images that are relevant for different locations. As an example, the control system 68 may instruct the projector 60 to output a first image 62 when the ride vehicle 54 is at a first position in which a guest is exiting the ride vehicle 54 (e.g., in an unloading area positioned at the end of a ride prior to restarting a path circuit). The first image 62 may, for example, provide instructions regarding how to exit the ride vehicle 54. The control system 68 may also instruct the projector 60 to provide a second image 62 when the ride vehicle 54 is at a second position in which a guest is entering the ride vehicle 54. For instance, the second image 62 may provide instructions regarding how to enter the ride vehicle 54, and such instructions may be different than instructions regarding how to exit the ride vehicle 54. As such, the control system 68 may adjust the image 62 being provided to present more appropriate or suitable instructions to the guests.

To this end, the control system 68 may be communicatively coupled to a sensor 74 configured to determine the position of the ride vehicle 54. For example, the sensor 74 may be a barcode reader on the ride vehicle 54 that reads barcode along a track, a camera that detects a barcode (e.g., a quick response code) on the ride vehicle 54, an optical sensor that detects retroreflective material on the ride vehicle 54, or the like. The sensor 74 may provide sensor data to the control system 68, and the sensor data may be indicative of the position of the ride vehicle 54 within the attraction system 50. In an embodiment, the sensor 74 may include a camera or other similar device configured to capture an image that includes the ride vehicle 54, and the control system 68 may determine the position of the ride vehicle 54 based on the captured image (e.g., via machine vision). Additionally or alternatively, the sensor 74 may output a signal within the attraction system 50, such as toward the ride vehicle 54, the signal may deflect (e.g., reflect) off the ride vehicle 54, and the sensor 74 may receive the deflected (e.g., reflected) signal and transmit sensor data associated with the deflected signal to the control system 68. The control system 68 and/or the sensor 74 may determine the position of the ride vehicle 54 based on a property of the deflected signal, such as an angle of deflection, a time of travel of the signal between output and receipt via the sensor 74, an intensity or attenuation of the deflected signal, and so forth. Furthermore, in one embodiment, the sensor 74 may be configured to determine a different parameter associated with the attraction system 50, such as a time of operation of the attraction system 50, a location of a guest within the attraction system 50 (e.g., with respect to the ride vehicle 54), and so forth, and the control system 68 may instruct the projector 60 to present the image 62 based on the parameter determined by the sensor 74.

The instructions provided via the image 62 may be more effective or beneficial than other techniques for providing instructions. For example, the image 62 may be presented without having to manually provide instructions, such as via an operator of the attraction system 50, for each guest. Furthermore, direct modifications, such as paintings or etchings, applied to the ride vehicle 54 and/or the guest area 58 may be avoided. The image 62 may be more easily adjusted, changed, or updated as compared to such modifications, and the image 62 may therefore be more readily presented in different manners. As such, the image 62 may increase a flexibility in which instructions may be provided for a guest. In an embodiment (e.g., an embodiment where the projector 60 is external to the ride vehicle 54), optical sensing of the ride vehicle 54 may facilitate calibration of the projector 60 to provide a projection location that is in a desired relative position to the ride vehicle 54.

Figure 2:
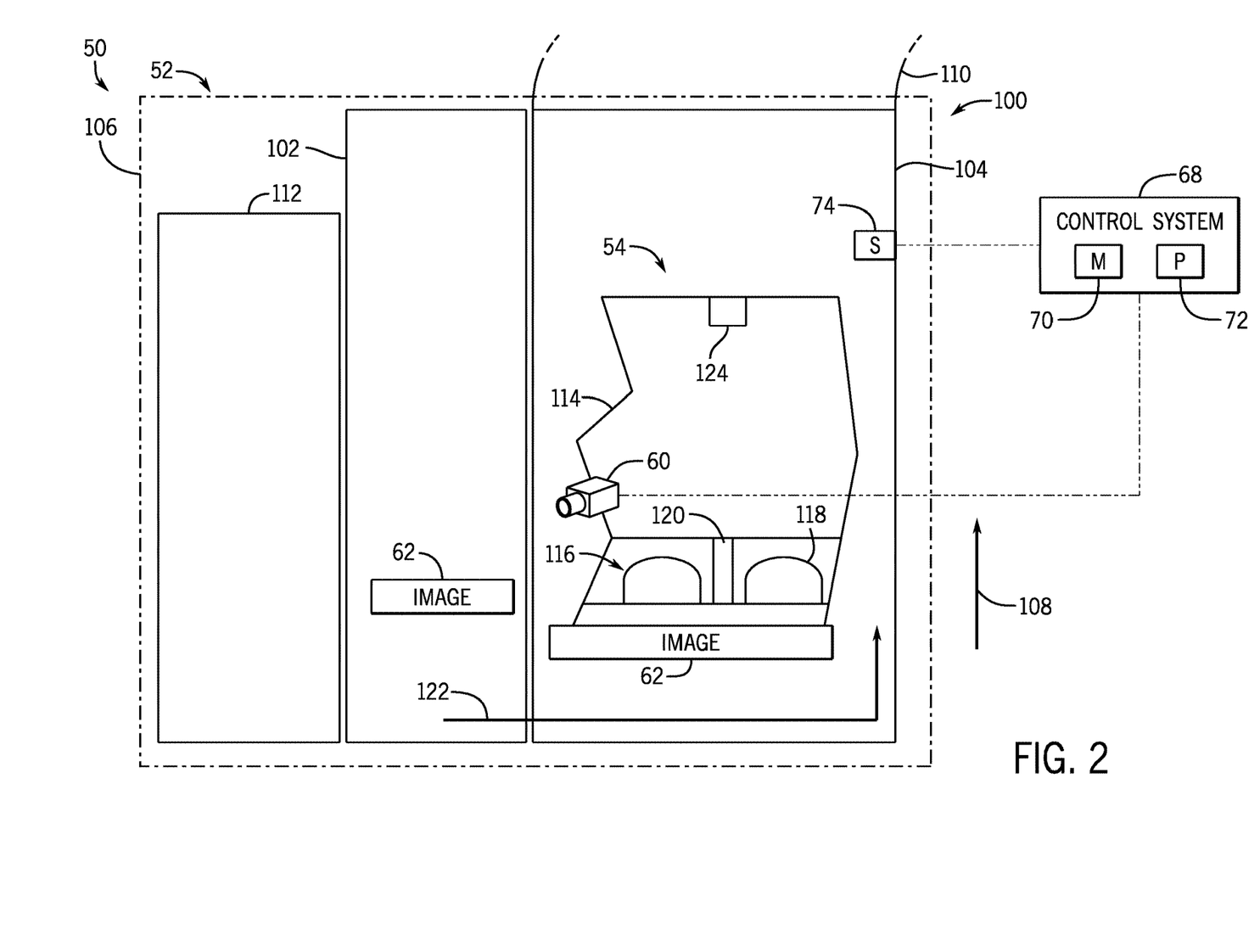
FIG. 2 is a top view of an embodiment of an attraction system with a path system, in accordance with an aspect of the present disclosure.

FIG. 2 is a top view of an embodiment of the attraction system 50 having the path system 52. The path system 52 may include a first path section 100 (e.g., a first path), such as a moving track, and the ride vehicle 54 may engage the first path section 100 to move through the attraction system 50. In an embodiment, the first path section 100 may move within the attraction system 50 to drive movement of the ride vehicle 54 within the attraction system 50. For example, an inner tube water-based ride may include such a moving track as the first path section 100. In an embodiment, the first path section 100 may also be a fixed track or open path along which the ride vehicle 54 travels. The path system 52 may also include a second path section 102 (e.g., a second path of the guest area 58 of FIG. 1), such as a moving walkway (e.g., a moving belt, a rotating platform, a moving pathway, a conveyor), that may move adjacent or proximate to and along a first portion 104 of the first path section 100 to provide a loading and/or unloading zone. As an example, the first portion 104 of the first path section 100 and the second path section 102 may be positioned within a loading/unloading station 106 of the attraction system 50 where guests may transition between the second path section 102 and the ride vehicle 54. For instance, a guest may move from the second path section 102, onto the first path section 100 (which may be moving with the second path section 102), and into the ride vehicle 54, and/or the guest may move out of the ride vehicle 54, onto the first path section 100, and onto the second path section 102. In a different example, the guest may move between the second path section 102 and the ride vehicle 54 without stepping on or otherwise directly contacting the first path section 100. In either case, the guest may utilize the second path section 102 to enter and/or exit the ride vehicle 54. For this reason, the second path section 102 may move alongside the ride vehicle 54, such as along with movement of the first portion 104 of the first path section 100, to facilitate transition between the first path section 100 and the second path section 102. That is, relative movement between the ride vehicle 54 and the second path section 102 may be restricted to enable ease of movement between the ride vehicle 54 and the second path section 102. For example, the ride vehicle 54 (e.g., via movement of the first path section 100 or some other vehicle motivation mechanism) and the second path section 102 may move along a first direction 108 (e.g., a horizontal direction, a forward direction) within the loading/unloading station 106. Thus, the second path section 102 may move in conjunction with the ride vehicle 54 during operation of the attraction system 100.

The ride vehicle 54 may move through the loading/unloading station 106 and to a second portion 110 (e.g., a thrill ride portion) of the first path section 100 where guests may not transition between the ride vehicle 54 and the second path section 102. For example, after a guest has entered the ride vehicle 54 (e.g., at the loading/unloading station 106, via the second path section 102), the guest may be secured within the ride vehicle 54, and the ride vehicle 54 may transition from the first portion 104 of the first path section 100 to the second portion 110 of the first path section 100 while the guest is secured within the ride vehicle 54. Thus, the guest may be blocked from exiting the ride vehicle 54 at the second portion 110 of the first path section 100. The second portion 110 of the first path section 100 may initially extend and guide the ride vehicle 54 away from the loading/unloading station 106 and therefore away from the second path section 102. For example, the second portion 110 of the first path section 100 may carry the guest through various features, such as up a hill, in a loop, along a curve, within a tunnel, down a drop, and so forth, to entertain the guest. In an embodiment, the second portion 110 of the first path section 100 may eventually extend and direct the ride vehicle 54 back to the loading/unloading station 106 and to the first portion 104 of the first path section 100, thereby completing a ride cycle or circuit. When the ride vehicle 54 has returned to the loading/unloading station 106, the guest may exit the ride vehicle 54, such as onto the second path section 102.

Additionally, the path system 52 may include a third path section 112 (e.g., a third path, a stationary path, a queue, a pathway of the guest area 58 of FIG. 1), which may at least partially extend into the loading/unloading station 106 adjacent to the second path section 102. The third path section 112 may enable guest navigation from an entrance of the attraction system 50 to the loading/unloading station 106 and/or from the loading/unloading station 106 to an exit of the attraction system 50. For instance, the third path section 112 may enable a guest to enter the attraction system 50 and navigate toward the ride vehicle 54 and/or to navigate from the ride vehicle 54 to exit the attraction system 50. The ride vehicle 54 and/or the second path section 102 may move relative to the third path section 112 within the loading/unloading station 106. For example, the third path section 112 may be stationary relative to the ride vehicle 54 and the second path section 102 in order to help the guest navigate through the attraction system 50. The second path section 102 may serve as an intermediate pathway that helps the guest more easily transition between the third path section 112 and the ride vehicle 54 to enter and/or exit the ride vehicle 54 via the third path section 112.

Although the first path section 100, the second path section 102, and the third path section 112 are separate path sections in the illustrated embodiment, the first path section 100, the second path section 102, and the third path section 112 may be considered a part of a single overall path that a guest may be guided along and/or carried over. For example, the path may extend from an entrance and/or exit of the attraction system 50 to the ride vehicle 54 loading/unloading area and may include at least a portion of each of the first path section 100, the second path section 102, and the third path section 112. Guests may navigate such a path to travel within the attraction system 50 via the ride vehicle 54 (as a passenger) or by self-navigation (e.g., walking), such as to navigate toward and/or away from the ride vehicle 54.

The image 62 may be output to visually provide procedural guidance to the guest for entering and/or exiting the ride vehicle 54. As an example, the ride vehicle 54 may have a chassis 114 with an irregular geometry that may not be easily traversable by a guest to enter and/or exit a seating area 116 within the ride vehicle 54. As another example, one of the seats 118 within the seating area 116 of the ride vehicle 54 may not be easily or readily accessible from the second path section 102. For instance, a barrier 120 positioned within the ride vehicle 54 (e.g., within the seating area 116) may block a guest from traveling across the seating area 116 to the seat 118. As a further example, another object or feature of the attraction system 50 may obstruct or block navigation between the seating area 116 and the second path section 102. For this reason, the image 62 may provide guidance regarding how to transition between the seating area 116 and the second path section 102. By way of example, the image 62 may direct the guest to travel along an indirect route 122 from the second path section 102 to the seating area 116, such as around a rear of the ride vehicle 54.

For this reason, the image 62 may be projected in a manner that is easily viewable to a guest. For example, the image 62 may be projected to follow movement of the ride vehicle 54, of the first path section 100, and/or of the second path section 102 through the loading/unloading station 106. Thus, a guest entering and/or exiting the ride vehicle 54 may more easily view the image 62. That is, the relative movement between the image 62 and the ride vehicle 54, between the image 62 and the first path section 100, and/or between the image 62 and the second path section 102 may be substantially avoided or blocked. As such, a guest on the second path section 102 and/or in the ride vehicle 54 may view the image 62 without, for example, having to search for an image that is in motion (e.g., relative to the first path section 100, the second path section 102, and/or the ride vehicle 54) while transitioning between the ride vehicle 54 and the second path section 102.

In one embodiment, the image 62 may be projected onto the second path section 102. In an additional or alternative embodiment, the image 62 may be projected onto the ride vehicle 54 and/or onto the first path section 100. Indeed, the image 62 may be projected onto any suitable location that may be visible to a guest and that may help provide the instructions regarding entering and/or exiting the ride vehicle 54. In the illustrated embodiment, the projector 60 is coupled to the ride vehicle 54, such as to the chassis 114. Thus, movement of the ride vehicle 54 (e.g., driven by movement of the first path section 100) may cause corresponding movement of the projector 60. The movement of the projector 60 may also cause movement of the image 62 output by the projector 60. For example, in an embodiment in which relative movement between the first path section 100 and the second path section 102 is restricted, movement of the first path section 100 may drive movement of the ride vehicle 54, and movement of the ride vehicle 54 may drive movement of the projector 60 to cause the image 62 to move along with the second path section 102. Thus, relative movement between the image 62 and the second path section 102 may also be restricted. In such an embodiment, the orientation of the projector 60 may be maintained to maintain the location of the image 62 relative to the ride vehicle 54. That is, the movement of the projector 60 with the ride vehicle 54 may maintain a location of the image 62 output by the projector 60 with respect to a position of the ride vehicle 54.

The control system 68 may be communicatively coupled to the projector 60 and may be configured to enable or suspend output of the image 62. For example, the control system 68 may receive sensor data from the sensor 74 and control operation of the projector 60 based on the sensor data. In an embodiment, the control system 68 may be configured to instruct the projector 60 to output the image 62 based on sensor data indicating that the ride vehicle 54 is positioned within the loading/unloading station 106. The control system 68 may also be configured to instruct the projector 60 to suspend output of the image 62 based on sensor data indicating that the ride vehicle 54 is not positioned within the loading/unloading station 106. For instance, the sensor 74 may be positioned within the loading/unloading station 106 and may capture optical data associated with the loading/unloading station 106. The optical data may indicate whether the ride vehicle 54 is positioned within the loading/unloading station 106. As an example, the sensor 74 may be configured to output a plurality of signals, such as infrared light, within the loading and/unloading station 106. A retroreflective element 124 (e.g., a sticker, a panel) may be attached to the ride vehicle 54, and the retroreflective element 124 may facilitate deflection (e.g., reflection) of a signal output by the sensor 74 onto the retroreflective element 124. Thus, while the ride vehicle 54 and the retroreflective element 124 are positioned within the loading/unloading station 106, the retroreflective element 124 may deflect a signal toward the sensor 74 to facilitate receipt of the signal via the sensor 74. As such, the sensor 74 may determine the ride vehicle 54 is positioned within the loading/unloading station 106 in response to receiving a deflected signal. The sensor 74 may additionally or alternatively use another technique to determine whether the ride vehicle 54 is positioned within the loading/unloading station 106, such as by capturing an image within the loading/unloading station 106, using a proximity measurement to determine whether the ride vehicle 54 has crossed a boundary to enter and/or exit the loading/unloading station 106, and so forth.

In an embodiment, the attraction system 50 may include multiple ride vehicles 54, and a separate projector 60 may be coupled to each of the ride vehicles 54. The control system 68 may be communicatively coupled to each projector 60 and may be configured to operate each of the projectors 60 independently of one another to output a respective image 62. For example, the control system 68 may operate each projector 60 based on whether the corresponding ride vehicle 54 to which a projector 60 is coupled is positioned within the loading/unloading station 106. In an additional or alternative embodiment, separate control systems 68 may be configured to control operation of the projectors 60 to output the respective images 62. For example, each projector 60 may include an internal control system 68 that may be dedicated to control the projector 60 in which the control system 68 is enclosed to output the image 62. In either embodiment, separate images 62 may be projected at respective locations adjacent to the ride vehicles 54 to help a guest enter and/or exit a particular ride vehicle 54.

Figure 3:
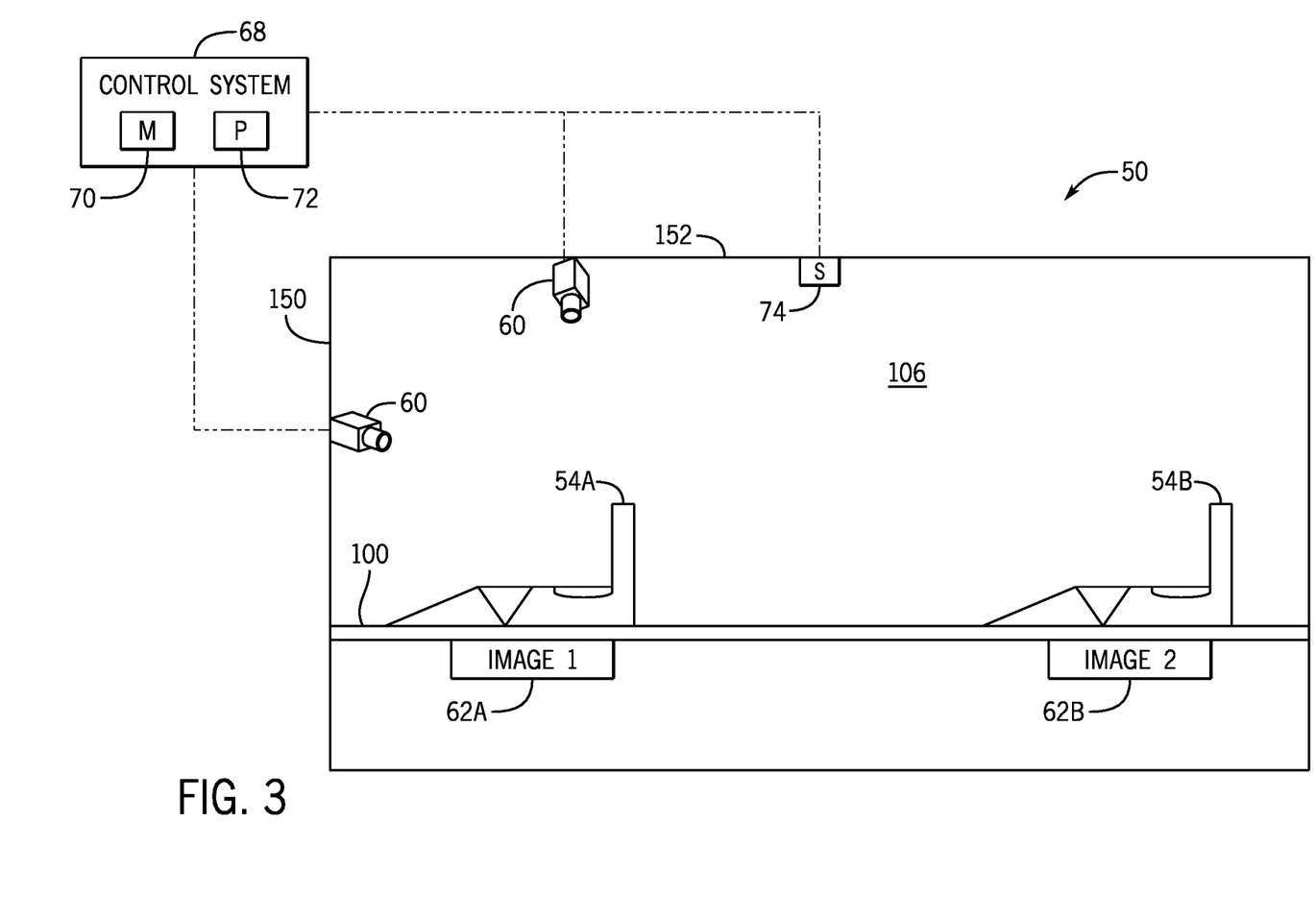
FIG. 3 is a side view of an embodiment of an attraction system with a path system, in accordance with an aspect of the present disclosure.

FIG. 3 is a side view of an embodiment of the attraction system 50, such as of the loading/unloading station 106. In the illustrated embodiment, a first ride vehicle 54A and a second ride vehicle 54B are positioned within the loading/unloading station 106. For this reason, a first image 62A may be projected on, adjacent to, or proximate to (e.g., on the second path section 102 of FIG. 2) the first ride vehicle 54A to facilitate entrance to and/or exit from the first ride vehicle 54A, and a second image 62B may be projected on, adjacent to, or proximate to (e.g., on the second path section 102 of FIG. 2) the second ride vehicle 54B to facilitate entrance to and/or exit from the second ride vehicle 54B. Furthermore, the projector 60 may not be coupled to either of the ride vehicles 54. Instead, the projector 60 may be mounted to a different support of the attraction system 50. For example, the projector 60 may be coupled to a wall 150 (e.g., a side wall), a ceiling 152, and/or another support within the loading/unloading station 106, and the ride vehicles 54 may move relative to the projector 60 (e.g., via movement of the first path section 100). Therefore, the projector 60 may be controlled to adjust the image 62 output by the projector 60 to enable the image 62 to follow movement of a corresponding ride vehicle 54 and maintain a location of the image 62 relative to the corresponding ride vehicle 54. The projector 60 may also be located on a separate moving feature, such as an overhead conveyance system, a trolley, or a drone that can move the projector 60 (and thus the corresponding projected image 62) relative to other aspects of the system. For example, the projector 60 may be moved in a separate vehicle but in coordination with the ride vehicle 54.

The control system 68 may determine a position of the first ride vehicle 54A within the loading/unloading station 106 (e.g., with respect to the projector 60) via sensor data received from the sensor 74. Based on the position, the control system 68 may determine a target location (e.g., with respect to the projector 60) to which the first image 62A is to be projected. The control system 68 may then instruct the projector 60 to output the first image 62A at the target location. As the first ride vehicle 54A moves within the loading/unloading station 106, such as via movement of the first path section 100, the control system 68 may determine an updated position of the first ride vehicle 54A. The control system 68 may also determine an updated target location based on the updated position of the first ride vehicle 54A and instruct the projector 60 to output the first image 62A at the updated target location. Accordingly, the control system 68 may cause the projector 60 to move the location of the first image 62A based on movement of the first ride vehicle 54A in order to maintain the location of the first image 62A relative to the position of the first ride vehicle 54A. In an embodiment, upon determining that the first ride vehicle 54A is no longer positioned within the loading/unloading station 106, the control system 68 may instruct the projector 60 to suspend output of the first image 62A.

Similarly, the control system 68 may determine a position of the second ride vehicle 54B, determine a target location to which the second image 62B is to be projected, and instruct the projector 60 and/or a different projector to output the second image 62B at the target location. The second image 62B may be projected independently of projection of the first image 62A. That is, the control system 68 may cause the second image 62B to be projected based on the position of the second ride vehicle 54B regardless of the position of the first ride vehicle 54A. As such, the control system 68 may cause individual images 62 to be output at different positions adjacent or proximate to the respective ride vehicles 54 based on received sensor data. For example, the control system 68 may cause the projector 60 to projection map the images 62 onto a surface within the loading/unloading station 106 by determining the positioning of the ride vehicles 54 within the loading/unloading station 106 and instructing the projector 60 to output the images 62 onto a suitable surface (e.g., of one of the ride vehicles 54, of the second path section) based on the positioning.

Figure 4:
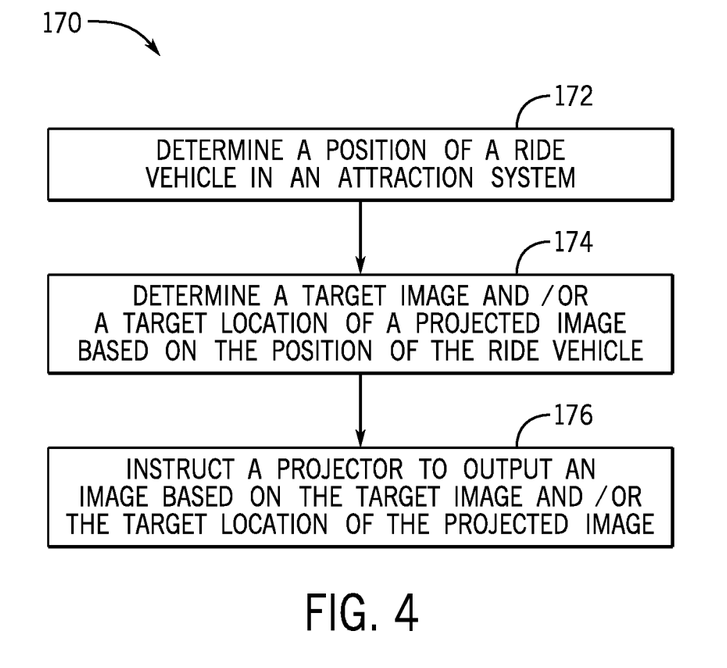
FIG. 4 is a flowchart of an embodiment of a method for operating a projector of an attraction system, in accordance with an aspect of the present disclosure.

FIG. 4 is a flowchart of an embodiment of a method or process 170 for operating an attraction system (e.g., the attraction system 50 of FIGS. 1-3). Any suitable device or component (e.g., the processing circuitry 72 of the control system 68 of FIGS. 1-3) may perform the method 170. For example, the same device or a different device may perform each step of the method 170. In one embodiment, the method 170 may be implemented by executing instructions stored in a tangible, non-transitory, computer-readable medium (e.g., the memory 70 of the control system 68 of FIGS. 1-3). For instance, the method 170 may be performed at least in part by one or more software components, one or more software applications, and the like. While the method 170 is described using steps in a specific sequence, additional steps may be performed, the described steps may be performed in different sequences than the sequence illustrated, and/or certain described steps may be skipped or not performed altogether.

At block 172, a position of a ride vehicle within an attraction system, such as with respect to a projector, may be determined. For example, the position of the ride vehicle may be determined via sensor data received from a sensor. At block 174, based on the position of the ride vehicle, a target image and/or a target location (e.g., with respect to the projector) of a projected image may be determined. As an example, a particular target image may be determined in response to determining that the position of the ride vehicle is in a particular portion of the attraction system. For example, a first target image that includes guidance associated with entering the ride vehicle may be determined in response to determining that the ride vehicle is in a portion of the attraction system where a guest may enter the ride vehicle. A second target image that includes guidance associated with exiting the ride vehicle may be determined in response to determining that the ride vehicle is in a portion of the attraction system where a guest may exit the ride vehicle. Moreover, no target image may be determined in response to determining that the position of the ride vehicle is outside of a particular portion of the attraction system. Furthermore, the target location may include a location on the ride vehicle and/or adjacent or proximate to the ride vehicle (e.g., on the second path section 102 of FIG. 2). Such locations may depend on the position of the ride vehicle in the attraction system.

At block 176, the projector may be instructed to output an image based on the target image and/or the target location of the projected image. For example, image data may be determined based on the target image and/or the target location of the projected image, and the image data may be transmitted to the projector. The projector may then output the image based on the image data. Furthermore, an orientation and/or positioning of the projector may be adjusted to project the image to the target location. The image output by the projector (e.g., on or adjacent to or proximate to the ride vehicle) may be readily or easily visible to a guest entering and/or exiting a ride vehicle.

The steps of the method 170 may be iteratively repeated during operation of the attraction system. For example, the position of the ride vehicle may constantly change during operation, and an updated target image and/or an updated target location of a projected image may be determined based on the changing position of the ride vehicle. The projector may therefore be instructed to update the image being output based on the position of the ride vehicle. For example, the projector may be instructed to adjust the location of the image to move the image along with movement of the ride vehicle, thereby blocking relative movement between the image and the ride vehicle. Such positioning of the projected image relative to the ride vehicle may facilitate viewing by a guest.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An attraction system of an amusement park, the attraction system comprising:
    a ride vehicle configured to move along a path of the attraction system;
    a pathway configured to move alongside the ride vehicle; and
    a projector configured to project an image that follows movement of the ride vehicle along the path and movement of the pathway alongside the ride vehicle.

2. The attraction system of claim 1, wherein the projector is configured to move with the ride vehicle to cause the image projected by the projector to follow the movement of the ride vehicle along the path and the movement of the pathway alongside the ride vehicle.

3. The attraction system of claim 2, wherein the projector is coupled to the ride vehicle, and the movement of the ride vehicle along the path drives movement of the projector with the ride vehicle.

4. The attraction system of claim 1, wherein the ride vehicle and the pathway are configured to move relative to the projector, and the projector is configured to adjust a location at which the image is projected to follow the movement of the ride vehicle along the path and the movement of the pathway alongside the ride vehicle.

5. The attraction system of claim 4, comprising a controller communicatively coupled to the projector, wherein the controller is configured to perform operations comprising:
    determining a position of the ride vehicle in the attraction system;

determining a target location based on the position of the ride vehicle; and instructing the projector to project the image at the target location to cause the projector to project the image that follows the movement of the ride vehicle along the path and the movement of the pathway alongside the ride vehicle.

6. The attraction system of claim 4, wherein the projector is coupled to a wall of the attraction system.

7. The attraction system of claim 1, wherein the projector is configured to project the image onto the pathway.

8. An attraction system of an amusement park, the attraction system comprising:

a path system comprising a first path section and a second path section configured to move alongside one another;

a ride vehicle coupled to the first path section, wherein movement of the first path section drives movement of the ride vehicle; and a projector configured to project an image that follows the movement of ride vehicle and movement of the second path section.

9. The attraction system of claim 8, comprising a loading/unloading station, wherein the first path section and the second path section move alongside one another at the loading/unloading station, and the first path section extends away from the second path section outside of the loading/unloading station.

10. The attraction system of claim 8, wherein the projector is configured to project the image onto the ride vehicle.

11. The attraction system of claim 8, comprising a controller communicatively coupled to the projector, wherein the controller is configured to perform operations comprising:

determining a position of the ride vehicle within the attraction system;

instructing the projector to project the image that follows the movement of the ride vehicle and the movement of the second path section in response to determining that the position of the ride vehicle is within a determined portion of the attraction system; and instructing the projector to suspend projection of the image in response to determining that the position of the ride vehicle is outside of the determined portion of the attraction system.

12. The attraction system of claim 8, comprising a third path section, wherein the third path section remains stationary relative to the first path section and the second path section, and the second path section is positioned between the first path section and the third path section.

13. The attraction system of claim 8, comprising an additional ride vehicle coupled to the first path section, wherein the projector is configured to project an additional image that follows movement of the additional ride vehicle and the movement of the second path section.

14. An attraction system of an amusement park, the attraction system comprising:

a ride vehicle configured to move along a path of the attraction system;

a projector configured to project an image; and a controller communicatively coupled to the projector, wherein the controller is configured to perform operations comprising:

determining a position of the ride vehicle;

determining a target location based on the position of the ride vehicle; and instructing the projector to project the image at the target location to maintain a location of the image relative to the ride vehicle during movement of the ride vehicle along the path.

15. The attraction system of claim 14, comprising a walkway configured to move alongside the ride vehicle, and the controller is configured to instruct the projector to project the image at the target location to maintain a location of the image relative to the walkway and the ride vehicle during movement of the walkway alongside the ride vehicle.

16. The attraction system of claim 14, wherein the controller is configured to perform operations comprising:

determining a first position of the ride vehicle;

determining a first image based on the first position of the ride vehicle;

instructing the projector to project the first image in response to determining the first image;

determining a second position of the ride vehicle;

determining a second image based on the second position of the ride vehicle; and instructing the projector to project the second image in response to determining the second image.

17. The attraction system of claim 14, comprising a sensor configured to determine the position of the ride vehicle, wherein the sensor is communicatively coupled to the controller and is configured to output sensor data to the controller, and the controller is configured to determine the position of the ride vehicle based on the sensor data received from the sensor.

18. The attraction system of claim 17, wherein the sensor is configured to emit a signal and receive a reflection of the signal, and the controller is configured to determine the position of the ride vehicle based on the reflection of the signal.

19. The attraction system of claim 18, comprising a retroreflective element attached to the ride vehicle, wherein the retroreflective element is configured to reflect the signal emitted by the sensor toward the sensor to enable the sensor to receive the reflection of the signal.

20. The attraction system of claim 14, wherein the projector is not coupled to the ride vehicle.

* * * * *